United States Patent
Boryslawski et al.

(10) Patent No.: US 6,579,476 B2
(45) Date of Patent: Jun. 17, 2003

(54) METHOD FOR MOLDING OPHTHALMIC LENSES MADE OF PLASTIC MATERIAL

(75) Inventors: Joseph Boryslawski, St. Petersburg, FL (US); Gabriel Keita, Oldsmar, FL (US); Yassin Yusef Turshani, Largo, FL (US)

(73) Assignee: Essilor International Compagnie Generale d'Optique, Charenton cedex (FR)

(*) Notice: Subject to any disclaimer, the term of this patent is extended or adjusted under 35 U.S.C. 154(b) by 110 days.

(21) Appl. No.: 09/814,333

(22) Filed: Mar. 21, 2001

(65) Prior Publication Data

US 2002/0167096 A1 Nov. 14, 2002

(51) Int. Cl.$^7$ .............................................. B29D 11/00
(52) U.S. Cl. ......................... 264/1.1; 264/2.1; 425/808
(58) Field of Search ................................ 264/1.1, 1.36, 264/1.38, 2.1, 2.5; 425/808

(56) References Cited

U.S. PATENT DOCUMENTS

| | | | | |
|---|---|---|---|---|
| 3,070,746 A | | 12/1962 | Moore et al. .................. 324/65 |
| 3,070,846 A | * | 1/1963 | Schrier | |
| 3,136,000 A | * | 6/1964 | Slyk | |
| 4,560,342 A | * | 12/1985 | Ishida et al. | |
| 4,693,446 A | | 9/1987 | Orlosky ........................ 249/53 |
| 5,547,618 A | | 8/1996 | Magne ....................... 264/1.36 |
| 5,605,656 A | * | 2/1997 | Sasano | |
| 5,662,839 A | | 9/1997 | Magne ....................... 264/1.38 |
| 6,391,231 B1 | * | 5/2002 | Evans et al. | |

* cited by examiner

Primary Examiner—Mathieu D. Vargot
(74) Attorney, Agent, or Firm—Fulbright & Jaworski L.L.P.

(57) ABSTRACT

A method for molding a plastic ophthalmic lens which comprises introducing a liquid polymerizable composition in a molding cavity of a two-piece mold through a filling nozzle in flow communication with the upper half of the molding cavity and spaced apart from the central vertical axis of the molding cavity up to the time the lower half of the molding cavity is filled. Then, tilting the mold to bring the filling in register with the central axis of the molding cavity and achieving full filling of the molding cavity. Thereafter, polymerizing the composition and recovering the lens.

7 Claims, 2 Drawing Sheets

METHOD FOR MOLDING OPHTHALMIC LENSES MADE OF PLASTIC MATERIAL

BACKGROUND OF THE INVENTION

1. Field of the Invention

The present invention pertains to a method for molding plastic ophthalmic lenses and more particularly to an improved step for filling the mold cavity.

2. Description of the Prior Art

Plastic lenses for eye glasses have traditionally been manufactured using well known molds and molding technics.

Classically, there is used a mold consisting of two pieces that are separated and sealed by either a tape or a gasket for defining a molding cavity.

A liquid polymerizable monomer composition is introduced in the mold cavity by means of a filling nozzle passing through the tape or gasket. Filling of the mold cavity can be effected either from the top or the bottom of the mold.

Examples of such mold and mold filling methods are disclosed in U.S. Pat. No. 3,070,746, U.S. Pat. No. 4,693,446, U.S. Pat. No. 5,547,618 and U.S. Pat. No. 5,662,839.

These molds and filling methods ate effective and used in the industry.

However, when the mold cavity is filled up with the liquid polymerizable monomer composition from the top of the mold, air bubbles are often entrapped within the liquid composition resulting in defectuous lenses. This entrapping of air bubbles is particularly pronounced when molding minus lenses.

In fact, the mold cavity for molding minus lenses is thinner at its central portion than at its peripheral portion and due to the thinness of the mold central portion it is likely that air bubbles are entrapped within the liquid composition in this central portion and cannot escape from the composition.

SUMMARY OF THE INVENTION

Thus, the aim of the invention is to provide a method for molding plastic lenses using a two-piece mold which is filled by the top and avoiding entrapping of air bubbles within the liquid polymerizable monomer composition filling the mold cavity.

Accordingly, the present invention contemplates a method for molding a plastic ophthalmic lens using a two-piece mold, said two-piece mold defining a molding cavity having a vertical central axis which is part of a fixed reference system comprising said vertical axis and a horizontal central axis which intersects at the center of the mold, said horizontal central axis dividing the molding cavity into a lower half and an upper half, and comprising a filling nozzle for introduction of a liquid polymerizable monomer composition into the molding cavity and situated at the periphery of the upper half of the mold cavity, said method comprising:

(a) starting introduction of the liquid polymerizable monomer composition into the molding cavity with the filling nozzle spaced apart from the vertical central axis of the mold cavity by a distance sufficient so that the liquid polymerizable monomer composition flows in a region of the molding cavity adjacent to the periphery thereof;

(b) continuing introduction of the liquid polymerizable monomer while the filling nozzle is spaced from the vertical central axis until at least the lower half of the molding cavity is filled up;

(c) moving relatively from each other the filling nozzle and the two-piece mold to bring the filling nozzle in register with the vertical central axis of the molding cavity;

(d) continuing introduction of the liquid polymerizable monomer composition while the filling nozzle is as in step (c) until the molding cavity is fully filled;

(e) stopping introduction of the liquid polymerizable monomer composition and polymerizing the composition; and (f) recovering the polymerized ophthalmic lens.

Preferably, in steps (a) and (b), the filling nozzle is spaced apart from the vertical central axis of the molding cavity by a distance at least equal to R/2, more preferably 3R/4 or more, where R is the radius of the molding cavity.

In step (c), although displacement of the two-piece mold relative to the filling nozzle can be effected either by tilting the two-piece mold or by moving the filling nozzle, it is preferred to do it by tilting the two-piece mold.

Relative displacement of the two-piece mold and the filling nozzle can be effected while continuing introduction of the liquid polymerizable monomer composition. It is also possible to stop introduction prior to step (c) and to restart introduction once the filling nozzle is in register with the vertical central axis of the molding cavity.

DETAILED DESCRIPTION OF THE PREFERRED EMBODIMENT

Figure 1:
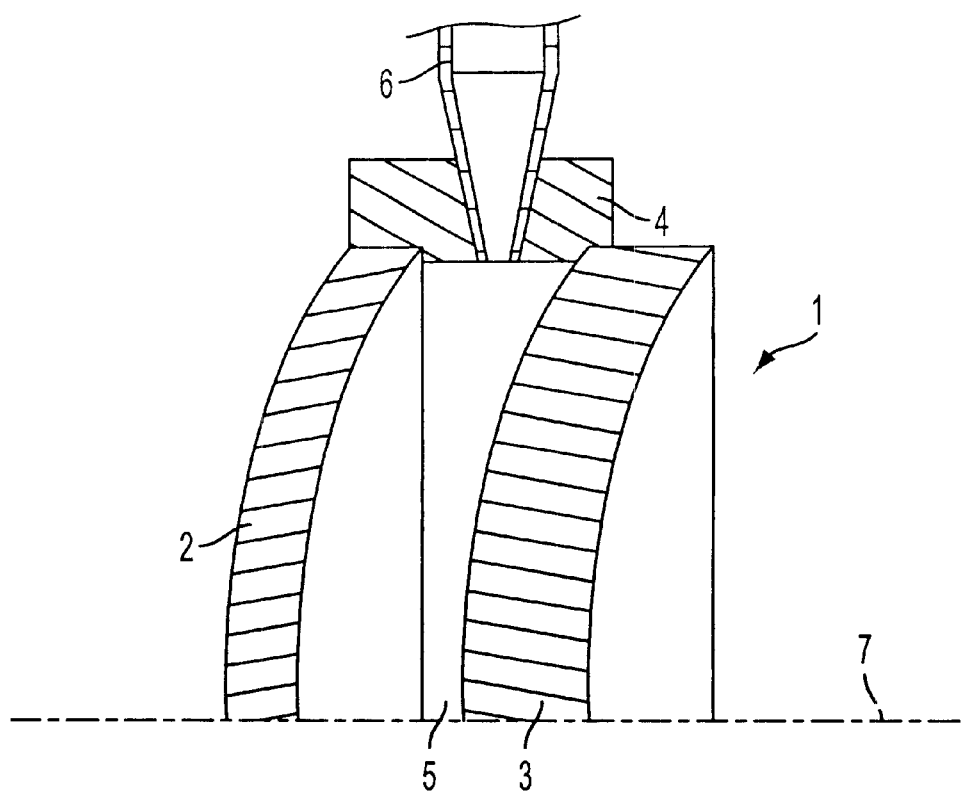
FIG. 1 is a schematic cross sectional view of a typical two-piece mold for molding ophthalmic lenses.

Referring to FIG. 1, there is represented schematically in cross section a typical two-piece mold 1 for molding an ophthalmic lens, in particular a minus ophthalmic lens.

As it is wed known, this two-piece mold 1 comprises a front piece 2 and a rear piece 3, maintained in a spaced apart relationship by a peripheral gasket 4 (or adhesive ribbon), thereby defining a molding cavity 5.

The confronting surfaces of the mold pieces 2, 3 are smoothly and accurately finished to the desired curvatures.

A clamp (not shown) or any other desired arrangement serves to urge the mold pieces 2, 3 into pressure engagement with gasket 4, thus securing the mold 1 in its assembled condition.

A filling nozzle 6, such as a flap valve, is mounted in flow communication with the upper half of the molding cavity 5, i.e. the half of the molding cavity 5 situated above the horizontal central axis 7 of the mold 1, through a passageway formed within gasket 4.

Figure 2A:
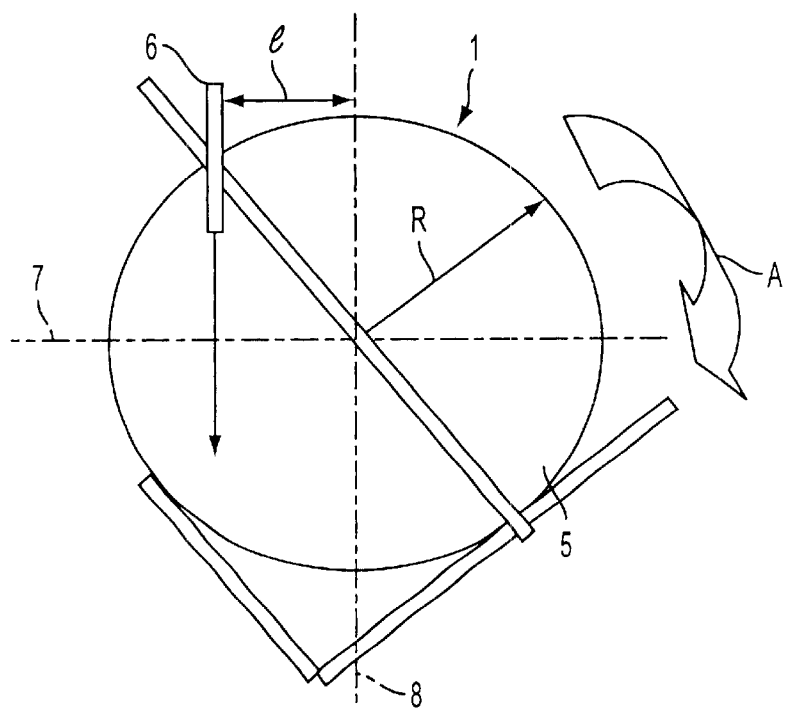
FIGS. 2A and 2B schematically illustrate the main steps of the process according to the invention.

As shown in FIG. 2A, before starting introduction of the liquid polymerizable monomer composition, filling nozzle 6 is spaced from the vertical central axis 8 (which is part of a fixed reference system comprising said vertical axis and the horizontal axis (7) which intersects at the center of the mold) of mold 1 by a distance l greater than R/2, (roughly equal to 0.625 R in the represented embodiment).

The introduction of the liquid polymerizable composition is pursued, maintaining the filling nozzle 6 in the above position, until approximately the lower half of tile mold cavity 5 is filled up with the composition. Although slightly less or more than half of the molding cavity 5 can be filled up with the composition, it is preferable to fill up half of the molding cavity with the filling nozzle 6 in the above described position;

With the filling nozzle 6 in the above described position, the liquid composition flows into the molding cavity 5 in a region adjacent to the periphery of the molding cavity, thus avoiding entrapping of air bubbles in the central position of the molding cavity.

Figure 2B:
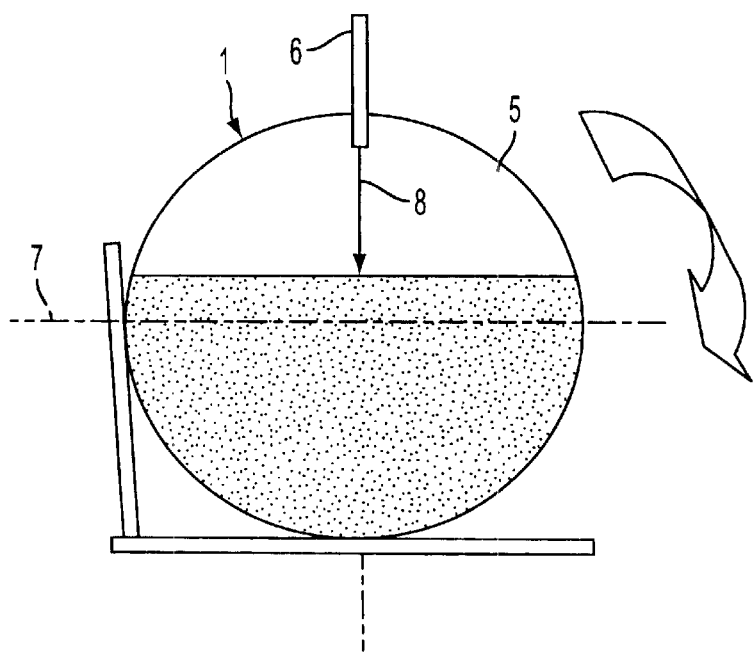

Once approximately half of the molding cavity 5 has been filled up with the liquid polymerizable composition, the two-piece mold is tilted in the direction shown by arrow A in FIG. 2A to bring the filling nozzle 6 in register with the vertical central axis 8 of the mold 1 as shown in FIG. 2B.

With the filling nozzle 6 in register with the central vertical axis 8, introduction of the liquid polymerizable composition is pursued up to complete filling of the molding cavity 5.

Of course, means shall be provided to allow relocation of the filling nozzle 6 in its register position with the central vertical axis 8 of the mold.

One possibility is to provide a passageway in gasket 4 capable to accommodate the mold tilting with the filling nozzle still in place, such as a slot managed in the gasket or adhesive ribbon.

On the other hand, instead of tilling the mold, the filling nozzle can be moved from one position to the other. Of course, means, such as a slot or adequately placed passageways must be provided in the gasket or adhesive ribbon for allowing accommodation of the filling nozzle in the desired positions.

Thereafter, polymerization and recovering of the lens is effected as usual in the art.

Using the above disclosed process, bubble free lenses and in particular bubble free minus lenses can be safely molded.

What is claimed is:

1. A method for molding a plastic ophthalmic lens using a two-piece mold, said two-piece mold defining a molding cavity having a vertical central axis which is part of a fixed reference system comprising said vertical axis and a horizontal central axis which intersects at the center of the mold, said horizontal central axis dividing the molding cavity into a lower half and an upper half, and comprising a filling nozzle for introduction of a liquid polymerizable monomer composition into the molding cavity and situated at the periphery of the upper half of the mold cavity, said method comprising:

(a) starting introduction of the liquid polymerizable monomer composition into the molding cavity with the filling nozzle spaced apart from the vertical central axis of the mold cavity by a distance sufficient so that the liquid polymerizable monomer composition flows in a region of the molding cavity adjacent to the periphery thereof;

(b) continuing introduction of the liquid polymerizable monomer while the filling nozzle is spaced from the vertical central axis until at least the lower half of the molding cavity is filled up;

(c) moving relatively from each other the filling nozzle and the two-piece mold to bring the filling nozzle in register with the vertical central axis of the molding cavity;

(d) continuing introduction of the liquid polymerizable monomer composition while the filling nozzle is as in step (c) until the molding cavity is fully filled;

(e) stopping introduction of the liquid polymerizable monomer composition and polymerizing the composition; and (f) recovering the polymerized ophthalmic lens.

2. The method of claim 1, wherein the filling nozzle is initially spaced apart from the vertical central axis of the molding cavity by a distance at least equal to R/2, where R is the radius of the molding cavity.

3. The method of claim 1, where the filling nozzle is initially spaced apart from the vertical axis of the molding cavity by a distance greater than R/2, where R is the radius of the molding cavity.

4. The method of claim 1, wherein the filling nozzle is initially spaced apart from the vertical axis of the molding cavity by a distance of $$\frac{3R}{4}$$

or more, where R is the radius of the molding cavity.

5. The method of claim 1, wherein in step (c) the relative movement of the filling nozzle and the mold is effected by tilting the mold.

6. The method of claim 1, wherein in step (c) the relative movement of the filling nozzle and the mold is effected by moving the filling nozzle.

7. The method of claim 1, wherein the two-piece mold is a mold for molding minus ophthalmic lenses.

* * * * *